(12) United States Patent
Sugita et al.

(10) Patent No.: US 12,306,647 B2
(45) Date of Patent: May 20, 2025

(54) FLOW RATE CONTROL DEVICE AND FLOW RATE CONTROL METHOD WHEREIN AN INTERNAL COMMAND SIGNAL IS GENERATED BY A COMBINATION OF FIRST ORDER LAG PROCESS AND RAMP PROCESS

(71) Applicant: FUJIKIN INCORPORATED, Osaka (JP)

(72) Inventors: Katsuyuki Sugita, Osaka (JP); Kouji Nishino, Osaka (JP); Kaoru Hirata, Osaka (JP); Shinya Ogawa, Osaka (JP); Keisuke Ideguchi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 361 days.

(21) Appl. No.: 17/760,431

(22) PCT Filed: Jan. 19, 2021

(86) PCT No.: PCT/JP2021/001601
§ 371 (c)(1),
(2) Date: Aug. 9, 2022

(87) PCT Pub. No.: WO2021/176864
PCT Pub. Date: Sep. 10, 2021

(65) Prior Publication Data
US 2023/0129479 A1    Apr. 27, 2023

(30) Foreign Application Priority Data
Mar. 5, 2020 (JP) .................. 2020-038161

(51) Int. Cl.
*G05D 7/06* (2006.01)
*G05B 19/414* (2006.01)

(52) U.S. Cl.
CPC ......... *G05D 7/0623* (2013.01); *G05B 19/414* (2013.01); *G05B 2219/37371* (2013.01)

(58) Field of Classification Search
CPC ................. G05B 2219/37371; G05D 7/0623
See application file for complete search history.

(56) References Cited

U.S. PATENT DOCUMENTS

2001/0037159 A1   11/2001   Boger et al.
2011/0048551 A1*   3/2011   Tanaka ................. G05D 7/0635
                                                                 137/486
(Continued)

FOREIGN PATENT DOCUMENTS

CN          1809737 A  *  7/2006  ......... G01L 19/0023
CN        205352664 U  *  6/2016
(Continued)

OTHER PUBLICATIONS

International Search Report issued in PCT/JP2021/001601; mailed Mar. 16, 2021.

*Primary Examiner* — Suresh Suryawanshi
(74) *Attorney, Agent, or Firm* — Studebaker Brackett PLLC

(57) ABSTRACT

A flow rate control device (8) includes a control valve (6) having a valve element and a piezoelectric element for moving the valve element, and an arithmetic processing circuit (7) for controlling an operation of the control valve, wherein the arithmetic processing circuit is configured to receive an external command signal SE corresponding to a target flow rate when opening the control valve from a closed state so that a gas flows at the target flow rate, and to generate an internal command signal E1 output to a driving circuit for determining a voltage applied to the piezoelectric element based on the external command signal, the internal command signal is a signal that rises with time from zero and converges to a value of the external command signal, (Continued)

and is generated such that a slope at the time of initial rise and a slope immediately before convergence are smaller than a slope therebetween.

8 Claims, 6 Drawing Sheets

(56) References Cited

U.S. PATENT DOCUMENTS

| | | | |
|---|---|---|---|
| 2011/0139271 A1* | 6/2011 | Hirata | G05D 7/0635 |
| | | | 137/487.5 |
| 2014/0076424 A1 | 3/2014 | Takijiri | |
| 2014/0374634 A1 | 12/2014 | Ohtsuki et al. | |
| 2016/0349763 A1 | 12/2016 | Hirose et al. | |
| 2019/0094847 A1* | 3/2019 | Nagase | G05D 7/0635 |
| 2020/0033895 A1 | 1/2020 | Sugita et al. | |

FOREIGN PATENT DOCUMENTS

| | | | |
|---|---|---|---|
| JP | 2003-120832 A | 4/2003 | |
| JP | 5867517 B2 | 2/2016 | |
| KR | 10-2014-0035820 A | 3/2014 | |
| TW | 201730526 A * | 9/2017 | G01F 1/42 |
| WO | 2015/083343 A1 | 6/2015 | |
| WO | WO-2018180745 A1 * | 10/2018 | G01F 1/36 |
| WO | WO-2019163676 A1 * | 8/2019 | F16K 31/004 |

\* cited by examiner (a)

(b)

(a)

($\tau = 50$, $r = 300$)

(b)

($\tau = 25$, $r = 300$)

(a)

($\tau = 50$, $r = 150$)

(b)

($\tau = 25$, $r = 150$)

(a)

(b)

FLOW RATE CONTROL DEVICE AND FLOW RATE CONTROL METHOD WHEREIN AN INTERNAL COMMAND SIGNAL IS GENERATED BY A COMBINATION OF FIRST ORDER LAG PROCESS AND RAMP PROCESS

TECHNICAL FIELD

The present invention relates to a flow rate control device and a flow rate control method, and more particularly, to a flow rate control device and a flow rate control method used in semiconductor manufacturing equipment, a chemical plant, or the like.

BACKGROUND OF INVENTION

In semiconductor manufacturing equipment and chemical plants, various types of flow meters and flow rate control devices are used for controlling the flow rate of material gases or etching gases. Among these, a pressure type flow rate control device is widely used, because it is capable of controlling mass flow rates of various fluids with high accuracy by a relatively simple mechanism that is combined with a control valve and a restriction part (e.g., an orifice plate or a critical nozzle). The pressure type flow rate control device has an excellent flow rate control characteristic that flow rate control can be performed stably even if the supply pressure of the primary side fluctuates greatly.

Among the pressure type flow rate control devices, there is a kind that controls the flow rate downstream of the restriction part by controlling a fluid pressure upstream of the restriction part (hereinafter, sometimes referred to as upstream pressure P1), which is described in Patent Document 1, for example. The upstream pressure P1 is measured by a pressure sensor and can be controlled to an arbitrary pressure by feedback controlling an opening degree of the control valve disposed upstream of the restriction part, based on an output of the pressure sensor.

As the control valve of the pressure type flow rate control device, a piezoelectric element driven valve configured to open and close a diaphragm valve element by a piezo actuator (hereinafter, sometimes referred to as a piezo valve) is used. The piezo valve, as disclosed in Patent Document 2 for example, can respond at a relatively high speed.

PRIOR-ART DOCUMENT

Patent Literature

Patent Document 1: International Patent Publication No. WO2015/083343
Patent Document 2: Japanese Laid-Open Patent Publication No. 2003-120832
Patent Document 3: Japanese Patent No. 5867517
Patent Document 4: International Patent Publication No. WO2018/180745

SUMMARY OF INVENTION

Problems to be Solved by Invention

When a normally closed piezo valve is in a closed state where no voltage is applied to the piezoelectric element, a diaphragm valve element is pressed against a valve seat by a biasing means such as a spring. This is to prevent the occurrence of leakage in the closed state. However, in the case where the valve element is pressed toward the valve seat in this manner, when the valve is opened, a force for moving the valve element against the biasing force is required, and therefore, the response to a rise may be delayed.

In order to solve this problem, in Patent Document 3, a technique is disclosed that, in a mass flow controller having a thermal type flow sensor, w % ben opening the piezo valve from a closed state, first to temporally apply a signal indicating a larger amplitude than a target voltage value corresponding to a target flow rate, thereby to improve the responsivity of the rise.

In the flow rate control device described in Patent Document 3, at the time of rise from the flow rate zero, the applied voltage of the piezo element is controlled so as to converge to the target voltage after momentarily applying a voltage exceeding the target voltage. By the instantaneous overshoot drive of the applied voltage as described above, rising time can be shortened while preventing overshoot of the flow rate.

However, as a result of experiments by the present inventors, it has been found that if the rate of change in the command signal input to the piezo valve driving circuit in the initial period of rise is too large, in particular, in the pressure type flow rate control device, when the flow rate rises to a small flow rate (low set flow rate), the response waveform of the actual gas flow may be distorted, also, the distortion of the response waveform changes depending on the magnitude of the set flow rate, and variations in control occur.

Therefore, particularly at the time of rise to a low set flow rate, there is a problem with performing the rise operation of the gas supply smoothly and suppressing variations in control, while maintaining the flow of gas as stable as possible, without substantially impairing the responsivity.

The present invention has been made in view of the above problems, and a main purpose of the present invention is to provide a flow rate control device and a flow rate control method capable of increasing the flow rate with a smooth flow at the time of flow rate rise.

Means for Solving Problem

The flow rate control device according to an embodiment of the present invention includes a control valve having a valve element and a piezoelectric element for moving the valve element, and an arithmetic processing circuit for controlling an operation of the control valve, wherein the arithmetic processing circuit is configured so as to receive an external command signal corresponding to a target flow rate, when opening the control valve from ta closed state so that a gas flows at the target flow rate, and to generate an internal command signal output to the driving circuit for determining the voltage applied to the piezoelectric element based on the external command signal, wherein the internal command signal is a signal that rises with time from zero and converges to a value of the external command signal, and is generated such that a slope at the time of initial rise and a slope immediately before convergence are smaller than a slope therebetween.

In an embodiment, the internal command signal is generated by a combination of a first order lag process and a ramp process.

In one embodiment, the internal command signal is generated according to the equation below, where $I'_n$ is a current value, $I'_{n-1}$ is a previous value. $Irmp_n$ is a current value of a ramp function defined by a ramp parameter r, and X is a time constant parameter corresponding to a time constant r of the first-order lag process.

$$I'_n = I'_{n-1} + (Irmp_n - I'_{n-1})/(1+X)$$

In one embodiment, the ramp parameter r and the time constant parameter X are configured to be set corresponding to the received external command signal In one embodiment, the target flow rate is a flow rate corresponding to 1-20% of the rated flow rate.

In one embodiment, the flow rate control device further comprises a restriction part provided downstream of the control valve, and a pressure sensor for measuring the fluid pressure of the control valve and the restriction part, wherein the control valve is configured to be feedback-controlled on the basis of the output of the pressure sensor.

The flow rate control method according to an embodiment of the present invention is performed using a flow rate control device including a control valve having a valve element and a piezoelectric element for moving the valve element. The flow rate control method includes a step of receiving a step-shaped external command signal indicating the target flow rate when opening the control valve from the closed state at the zero flow rate, and a step of generating an internal command signal output to the driving circuit for determining the voltage applied to the piezoelectric element based on the external command signal, wherein the internal command signal is a signal that rises with time from zero and converges to a value of the external command signal, and a slope at the time of initial rise and a slope immediately before the convergence are generated to be smaller than a slope therebetween.

Effect of Invention

According to the embodiments of the present invention, a flow rate control device and a flow rate control method capable of smoothly flowing gas at the time of rise even at a low flow rate setting and performing a stable rise operation without impairing the responsivity.

BRIEF DESCRIPTION OF DRAWINGS

FIG. 2 is a graph describing an internal command signal generated from an external setting signal, wherein FIG. 2(a) shows a graph of a comparative example in which only the first order lag process is applied, and FIG. 2(b) shows a graph of an example in which the first order lag process and the ramp process are combined.

FIG. 3(a) shows the case of using the internal command signal according to the comparative example of FIG. 2(a). FIG. 3(b) shows the case of using the internal command signal according to the embodiment of FIG. 2(b).

DETAILED DESCRIPTION OF EMBODIMENT

Embodiments of the present invention will be described below with reference to the drawings, but the present invention is not limited to the following embodiments.

Figure 1:
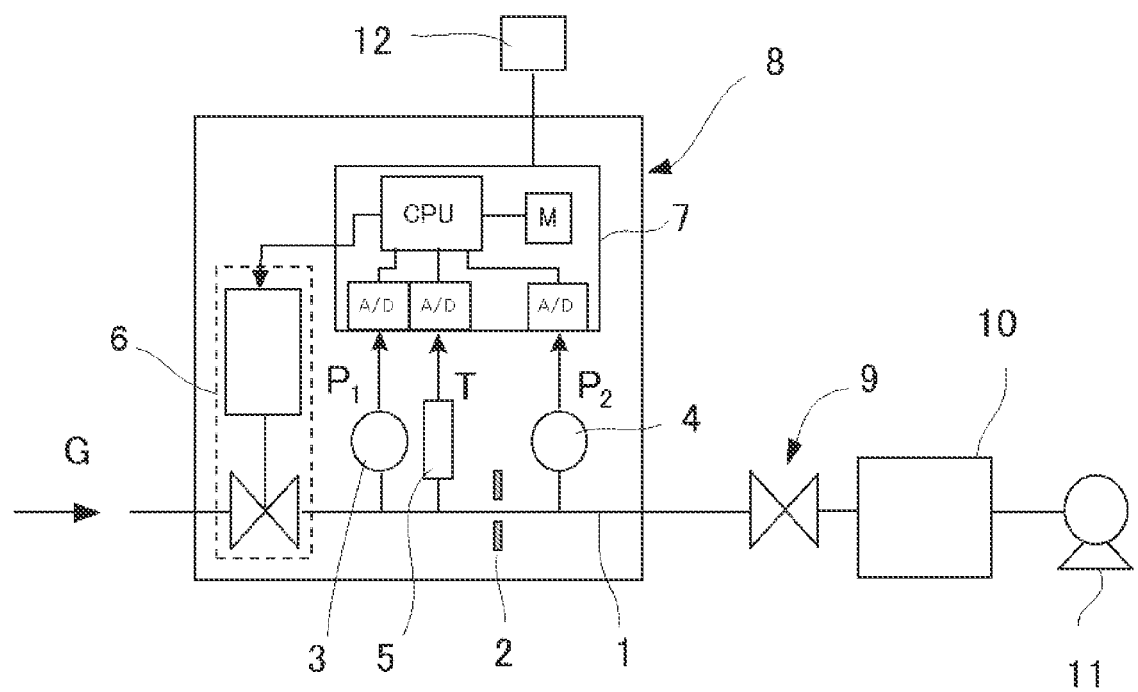
FIG. 1 is a schematic diagram showing the flow rate control device according to an embodiment of the present invention.

FIG. 1 shows a configuration of a flow rate control device 8 according to an embodiment of the present invention. The flow rate control device 8 is a pressure type flow rate control device including a restriction part 2 (e.g., orifice plate) interposed in a flow path (gas supply path) 1 through which a gas G passes, an upstream pressure sensor 3 and a temperature sensor 5 provided upstream of the restriction part 2, a downstream pressure sensor 4 provided downstream of the restriction part 2, and a control valve 6 provided upstream of the upstream pressure sensor 3.

The upstream pressure sensor 3 can measure an upstream pressure $P_1$, which is a fluid pressure between the control valve 6 and the restriction part 2. The downstream pressure sensor 4 can measure a downstream pressure $P_2$, which is a fluid pressure between the restriction part 2 and a downstream valve 9.

The flow rate control device 8 also includes an arithmetic processing circuit 7 for controlling the opening and closing operation of the control valve 6 based on the output of the upstream pressure sensor 3 and the downstream pressure sensor 4. The arithmetic processing circuit 7 compares a set flow rate determined by an external command signal from an external control device 12 with a calculated flow rate determined by the calculation from an output of the upstream pressure sensor 3 (measured flow), and performs feedback control of the control valve 6 so that the calculated flow rate approaches a set flow rate, i.e., the difference between the calculated flow rate and the set flow rate approaches zero.

The control valve 6 is a piezo valve having a diaphragm valve element disposed so as to abut and isolate the valve seat and a piezo actuator for moving the valve element. The piezo actuator may be constituted by a plurality of piezoelectric elements housed in a cylindrical body and may be constituted by a single piezoelectric element.

Unlike the illustrated embodiment, the flow rate control device 8 may not include the downstream pressure sensor 4. In this case, the arithmetic processing circuit 7 is configured to calculate the flow rate based on the output of the upstream pressure sensor 3. In one preferred embodiment, the arithmetic processing circuit 7 can correct the calculated flow rate based on the fluid temperature detected by the temperature sensor 5.

The flow rate control device 8 may include an inlet-side pressure sensor (not shown) provided upstream of the control valve 6 for measuring the gas supply pressure. The inlet pressure sensor can measure the pressure of the gas supplied from a connected gas supply apparatus, e.g., a raw material vaporizer, and can be used to control the gas supply quantity or the gas supply pressure.

As the restriction part 2, a critical nozzle or a sonic nozzle may be used in addition to an orifice member such as an orifice plate. The aperture diameter of the orifice or the nozzle is set to 10 μm to 2000 μm for example. As the downstream valve 9, a known air operated valve in which the supply of compressed air is controlled by the solenoid valve may be used. In addition, an orifice built-in valve having a configuration in which an on-off valve is disposed in the vicinity of the orifice member is known, the orifice built-in valve, the restriction part 2, and the downstream valve 9 can also be incorporated into the flow control device 8 as an integrated configuration.

The flow path 1 of the flow rate control device 8 may be configured by a pipe or may be configured by a flow path hole formed in a metal block. The upstream pressure sensor 3 and the downstream pressure sensor 4 may include a silicon single crystal sensor chip and a diaphragm for example. The control valve 6 may be a valve mechanism including a metal diaphragm valve element for example, such as a piezoelectric element driven diaphragm valve (piezo valve) configured to open and close using a drive mechanism, such as a piezoelectric actuator.

In the fluid supply system including the flow control device 8, the upstream side of the control valve 6 is connected to a gas supply source such as a material gas, an etching gas or a carrier gas, and the downstream side of the restriction part 2 is connected to a process chamber 10 of semiconductor manufacturing equipment via the downstream valve 9. A vacuum pump 11 is connected to the process chamber 10, and typically the interior of the process chamber 10 is evacuated upon gas delivery.

In the pressure type flow rate control device 8 as described above, the flow rate control is performed by utilizing the principle that when a critical expansion condition $P_1/P_2 \geq$ about 2 (for argon gas) is satisfied, the flow rate is determined by the upstream pressure $P_1$ regardless of the downstream pressure $P_2$. When the critical expansion condition is satisfied, the flow rate Q downstream of the restriction part 2 is given by $Q=K_1 \cdot P_1$ (where $K_1$ is a constant depending on the fluid species and the fluid temperature), the flow rate Q is proportional to the upstream pressure $P_1$ measured by the upstream pressure sensor 3. In addition, if a downstream pressure sensor 4 is provided, the flow rate can be calculated even when the difference between the upstream pressure $P_1$ and the downstream pressure $P_2$ is small and the above critical expansion condition is not satisfied, based on the upstream pressure $P_1$ and downstream pressure $P_2$ measured by the pressure sensors 3 and 4, the flow rate Q can be calculated from $Q=K_2 \cdot P_2^m (P_1-P_2)^n$ (where $K_2$ is a constant depending on the fluid species and the fluid temperature, m, n are indices derived from the actual flow rate).

In order to perform the flow rate control, the set flow rate set in an external controller 12 (target flow rate) is sent from the external controller 12 to the arithmetic processing circuit 7. Based on the output of the upstream pressure sensor 3, the arithmetic processing circuit 7 calculates the flow rate at any time using the flow rate calculation formula under the critical expansion condition or non-critical expansion condition, which is the calculated flow rate or the measured flow rate Q obtained from above $Q=K_1 \cdot P_1$ or $Q=K_2 \cdot P_2^m(P_1-P^2)^n$, and feedback controls the control valve 6 so that the flow rate of the fluid passing through the restriction part 2 approaches the set flow rate (i.e., the difference between the calculated flow rate and the set flow rate approaches 0). The calculated flow rate is output to the external controller 12 and may be displayed as a flow rate output value.

The arithmetic processing circuit 7 is typically incorporated in the flow rate control device 8 but may be provided outside the flow rate control device 8. The arithmetic processing circuit 7 typically includes a CPU, a memory M such as ROM, RAM, or A/D converters, and the like, and may include a computer program configured to execute a flow rate control operation to be described later. The arithmetic processing circuit 7 can be realized by a combination of hardware and software. The arithmetic processing circuit 7 may be provided with an interface for exchanging information with an external device such as a computer, so that programs and data can be written from the external device to the ROM. All of the elements of the arithmetic processing circuit 7 (such as the CPU) need not to be integrally provided in the device, and some components such as the CPU may be disposed in another place (outside the device) and connected to each other by a bus. At this time, the inside of the device and the outside of the device may communicate not only by wire but also wirelessly.

Hereinafter, the operation of the flow rate control device 8 in the case of changing the controlled flow rate from the flow rate zero, that is the closed state of the control valve 6, to the set flow rate (when the flow rate rises) will be described. In the present specification, the flow rate value may be expressed by a ratio in which a predetermined flow rate value, typically a rated flow rate value, is 100%.

As described above, in order to maintain the set flow rate (or set upstream pressure), the opening degree of the control valve 6 is feedback-controlled according to the output of the pressure sensor. However, the flow rate control device 8 of the present embodiment is adapted to generate an internal command signal that is not step-shaped, based on the step-shaped external command signal input from the external control device, and to perform feedback control based on a comparison of the internal command signal (target value signal) and the output of the pressure sensor.

The internal command signal is generated as a signal to gradually increase the target flow rate, rather than rising rapidly stepwise at the time of flow rate rise. With such a signal, the control valve is prevented from being opened instantaneously, and the occurrence of flow overshoot can be suppressed.

Figure 2:
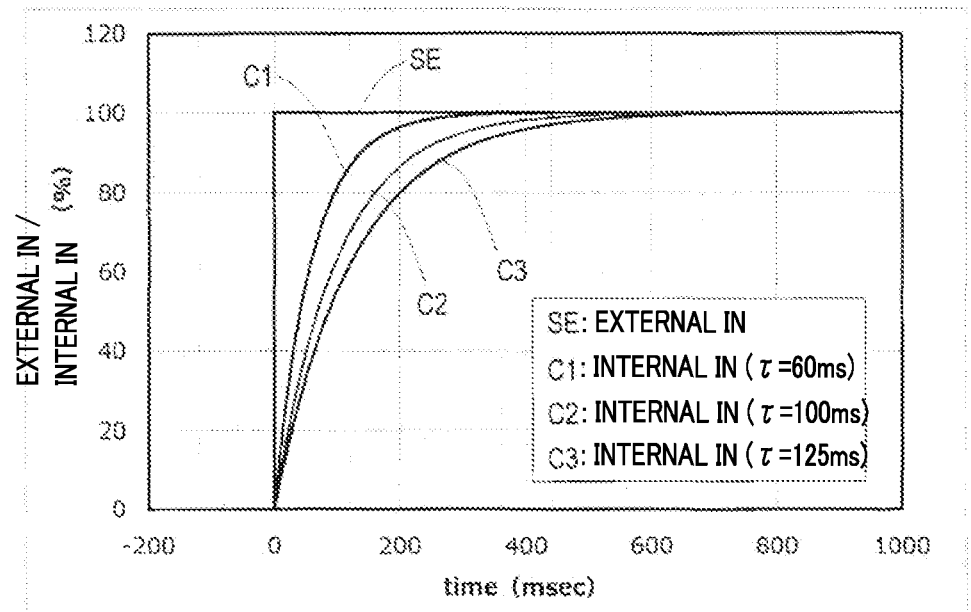
Figure 2:
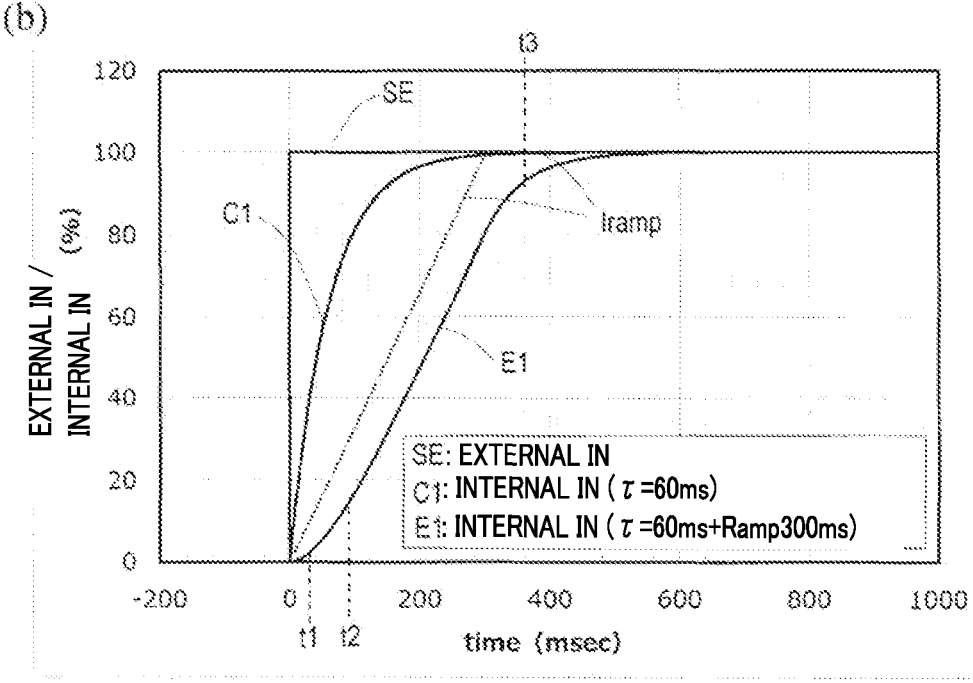

FIG. 2(a) and FIG. 2(b) show internal command signals generated by the arithmetic processing circuit 7 when receiving a step-shaped external command signal SE. FIG. 2(a) shows the internal command signals C1 to C3 of the comparative example, and FIG. 2(b) shows the internal command signal E1 of the embodiment and the signal C1 of the comparative example.

First, the internal command signal C1 of the comparative example will be described. The internal command signal C1 of the comparative example is generated by first order lag process applied to the external command signal SE. The first order lag process can be represented by the following Equation (1):

$$I'(t)=I(1-\exp(-t/\tau)) \qquad (1)$$

In Equation (1), I'(t) is the magnitude of the internal command signal, I is the magnitude of the external command signal (constant target value after the rise of the step-shaped signal), t is time, z is a time constant. By using the first order lag process, it is possible to converge to the target flow rate in a relatively short time while preventing the flow rate overshoot due to steep rise.

Then, the response of the internal command signal by the first order lag process is changed depending on the setting of the above time constant τ. As shown in FIG. 2(a), the smaller the time constant τ (e.g., 60 ms), the steeper the graph, and the larger the time constant τ (e.g., 125 ms), the gentler the graph. Assuming that the target value I=100%, when the time t is the time constant τ, I'(t)=1−1/e=about 63.2%, that is, the time constant τ means the time required to rise from 0% to about 63.2%. Therefore, it is possible to arbitrarily set the speed of the rise corresponding to the setting of the time constant τ, by setting a small time constant τ in a range where overshoot of the flow rate does not occur, response time can be shortened.

Further, the above first order lag process can be represented by the following Equation (1A):

$$I'_n = I'_{n-1} + (I_n - I'_{n-1})/(1+X) \tag{1A}$$

In Equation (1A), $I'_n$ is the n-th internal command value (current value), $I'_{n-1}$ is the n−1-th internal command value, i.e. the previous value of $I'_n$, $I_n$ is the external command value (constant value), and X is the time constant parameter (here, corresponding to the time constant τ described above). Note that n is an arbitrary natural number, and $I'_n$ is an internal command value when a time Δt×n, which is n times the command interval Δt, has elapsed.

As can be seen from Equation (1A), in the first order lag process, the n-th inner command value is generated by adding the difference $(I_n - I'_{n-1})$ between the external command value and the previous value to the previous value $I'_{n-1}$, at a fixed ratio based on the time-constant parameter X. The curve expressed by Equation (1A) becomes a gentler curve as the time constant parameter X is larger and becomes a steeper rising curve as the time constant parameter X is smaller. The time constant parameter X is typically a variable equivalent to the time constant t of the first order lag process, but is not limited to this, and may be a parameter defined so as to be uniquely determined from the time constant τ.

Here, in the above Equation (1A), since $I_n$ is a constant value, the difference $(I_n - I'_{n-1})$ becomes smaller as n becomes larger. That is, the variation $(I_n - I'_{n-1})/(1+X)$ with respect to the previous value $I'_{n-1}$ becomes smaller as time elapses according to the previous value, and this corresponds to the function of the first order lag expressed in Equation (1). In the first order lag process, the response is the fastest at the beginning of the rise, and becomes gradually gentle as time elapses, then asymptotically approaches the target value when sufficient time elapses.

Figure 3:
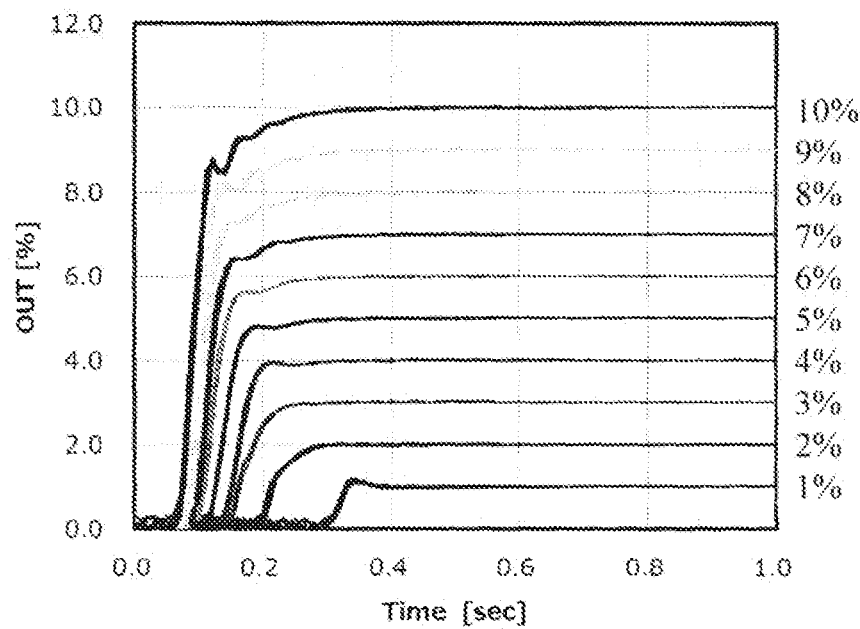
FIG. 3 is a graph showing an actual gas flow rate, which is a calculated flow rate based on an upstream pressure measured by the pressure sensor, when performing a rise operation to each set flow rate from the flow rate zero.
Figure 3:
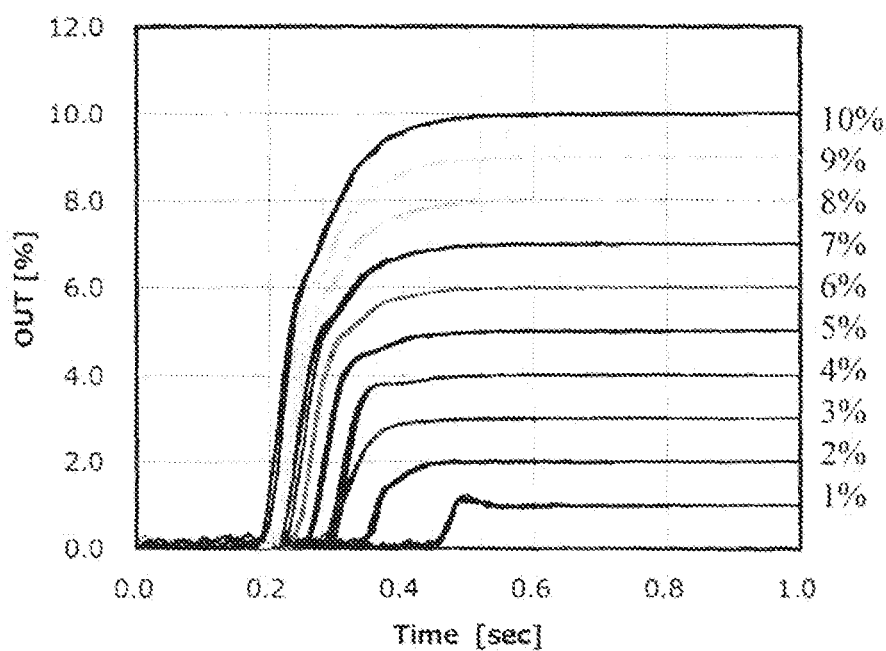

However, as shown in FIG. 3(a), when performing the opening operation of the valve to the small flow rate setting in the pressure type flow rate control device, in the case of the comparative example of generating the internal command signal only by the first order lag control, it can be confirmed that fluctuation in the gas flow rate has occurred in the later phase of the flow rate rise. This is presumed to be due to the fact that, with only the first order lag control, the rise of the internal command signal is too steep, and the flow of gas increases too sharply at the beginning of the valve opening, resulting in the formation of an unstable flow. In addition, since the valve attempts to respond to a steep rise, as a result, it becomes temporarily too open, and a valve is driven to eliminate this state, so a smooth valve opening operation was not performed.

Therefore, as shown in FIG. 2(b), the internal command signal E1 of the embodiment is made, by combining the first order lag process and the ramp process, so as to perform rise operation that is not steep at the beginning of the valve opening. Hereinafter, details will be described.

The first order lag process is represented by the above Equation (1) or Equation (1A), and the ramp processing (Irmp: post-ramp command) can be represented by the following Equation (2).

$$Irmp = I \times t/r \tag{2}$$

In Equation (2), 1 is the value of the external command, t is the time, and r is the ramp parameter. The ramp parameter r is a parameter for determining the slope of the ramp function, and when t=r, Irmp=I (target value according to the external command). That is, the ramp parameter r corresponds to the time needed for Irmp to reach I from 0 in the ramp process. The smaller the ramp parameter r, the larger the ramp slope (I/r), and the larger the ramp parameter r, the smaller the ramp slope (I/r).

Also, the above Equation (2) is applied when t≤r (or t<r), on the other hand, Irmp=I, i.e., a constant I, is maintained at any time t when t>r (or t≥r) after the ramp parameter r has elapsed. In FIG. 2(b), the ramp process is shown as the Irmp by a broken line.

Here, in order to perform a gentle rise at the beginning of the valve opening, in the present embodiment, the internal command signal E1 is generated based on the following Equation (3A) combining the first order lag process and the ramp process.

$$I'_n = I'_{n-1} + (Irmp_n - I'_{n-1})/(1+X) \tag{3A}$$

As can be seen from the comparison with Equation (1A), Equation (3A) is obtained by replacing $I_n$, which is a constant value regardless of time, in Equation (1A), with a time varying $Irmp_n$.

In this manner, as a result of combining the ramp process and the first order lag process, in the period of t≤r of the beginning of the valve opening, the inclination slope is greater at time t2 (second time point) after the time t1 (first time point) than the inclination slope at the time t1, which is closer to the beginning of the valve opening, that is, the value of the internal command signal is determined so as to form a function, by which the inclination is gentle at the beginning and increases gradually. This is because $Irmp_n$ increases with time, so the difference $(Irmp_n - I'_{n-1})$ and the amount of change with respect to the previous value $(Irmp_n - I'_{n-1})/(1+X)$ increases gradually with time in the initial period, which has a change rate smaller than the ramp slope $(I_n/r)$. Therefore, different from the case where control is performed only by the first order lag process, a steep rise (rise in which the amount of change decreases with time) in the initial period does not occur.

When time elapses from the initial period and the rate of change of $I'_n$ approaches the ramp slope $(I_n/r)$, the difference $(Irmp_n - I'_{n-1})$ becomes substantially constant. Therefore, the amount of change $(Irmp_n - I'_{n-1})/(1+X)$ is also constant, and $I'_n$ changes with the same slope as the ramp slope $(I_n/r)$.

Thereafter, in a period of t>r after time elapses and reaches the ramp parameter r, the $Irmp_n$ becomes a constant value $I_n$. For this reason, the process is equivalent to the above-mentioned Equation (1A) indicating the first order lag process, that is, the process converges so as to approach the external command value (constant value) $I_n$ over time while gradually decreasing the slope.

As described above, the internal command signal E1 as shown in FIG. 2(b) is generated. As shown in the drawing, the internal command signal E1 is a signal that rises with time from zero and converges to the value of the external command signal, and it is generated as a signal in which the slope at the time of initial rise and the slope at the time immediately before convergence are smaller than the slope therebetween. In the case where the flow rate rises from 0% to 100%, the slope at the time of initial rise means the slope at the time of 1% to 5% of the flow rate, and the slope immediately before convergence means the slope at the time of 95% to 99% of the flow rate.

In other words, the internal command signal E1 is generated as a signal having a first slope α1 at the first time t1 of the beginning of the valve opening starts at the rise of the flow rate setting signal, a second slope α2 larger than the first slope α1 at a second time t2 after the first time, and a third slope α3 smaller than the second slope α2 at a third time t3 after the second time t2, and converging to the target value I after the third time t3.

The internal command signal generated as described above is output to the valve drive circuit for determining the voltage applied to the piezoelectric element. In the feedback control, the valve drive circuit controls the voltage applied to the piezoelectric element so that the difference between the flow rate corresponding to the internal command signal and the calculated flow rate obtained from the output of the pressure sensor becomes zero, thereby, it is possible to make the opening and closing operation of the valve to adapt the flow characteristics of the actual gas. Therefore, at the time of flow rate rise, it is possible to increase the gas flow rate in a smoother gas flow.

FIG. 3(b) shows the gas flow rate (output of the pressure sensor) when performing the flow control based on the internal command signal E1 generated by combining the first order lag process and the ramp process as described above. As shown in FIG. 3(b), it can be confirmed that the gas flows smoothly compared to the comparative example shown in FIG. 3(a) when the flow rate increases to a small flow rate setting of 1 to 10%. The internal command signal E1 of the present embodiment is suitably used, for example, in the flow rate rise to 1 to 20%, particularly 1 to 10%. However, it is needless to say that the internal command signal of the present embodiment may be used for rise at not only a low flow rate but also an arbitrary flow rate of 1 to 100%.

The arithmetic processing circuit 7 may be configured to determine whether to generate the internal command signal by a combination of the first order lag process and the ramp process described above based on the magnitude of the target flow rate in the external command signal. For example, it may be configured to generate the internal command signal E of the embodiment in order to stabilize the flow of the gas when rising to the low flow rate setting of 1 to 20% as described above, on the other hand, to generate the internal command signal C of the comparative example only by the first order lag process when rising to the flow rate setting of 21% to 100% in order to shorten the response time.

As can be seen by comparing FIG. 3(a) and FIG. 3(b), there is a possibility that the response time becomes longer when the ramp processing is combined than when only the first order lag process is used. For this problem, by appropriately setting the time constant τ of the first order lag process and the ramp parameter r of the ramp process, it is possible to avoid degrading the responsivity.

Figure 4:
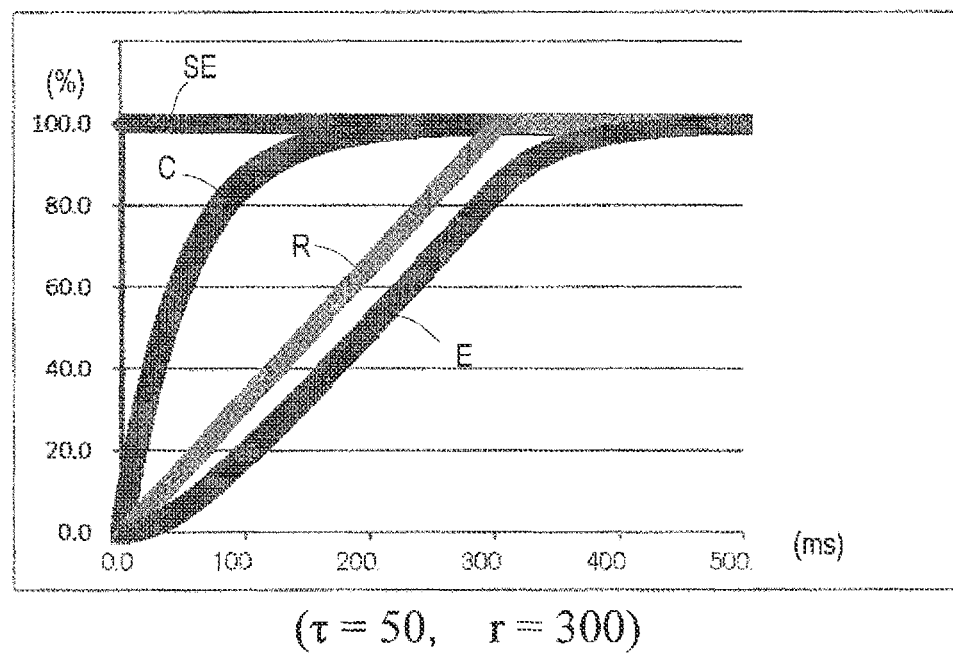
FIG. 4 is a graph showing each signal waveform when changing the time constant τ and the ramp parameter r.
Figure 4:
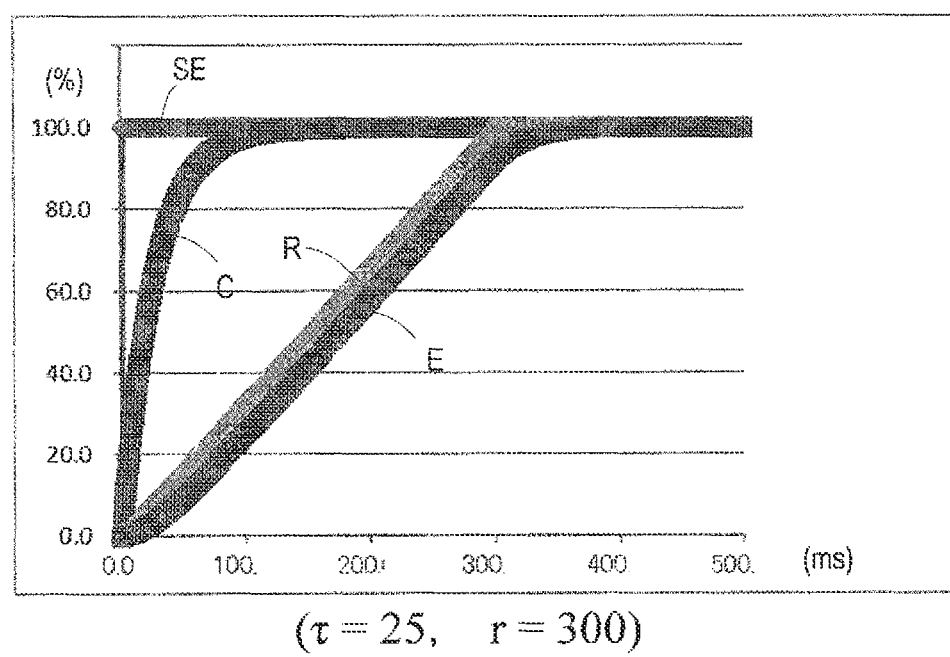
Figure 5:
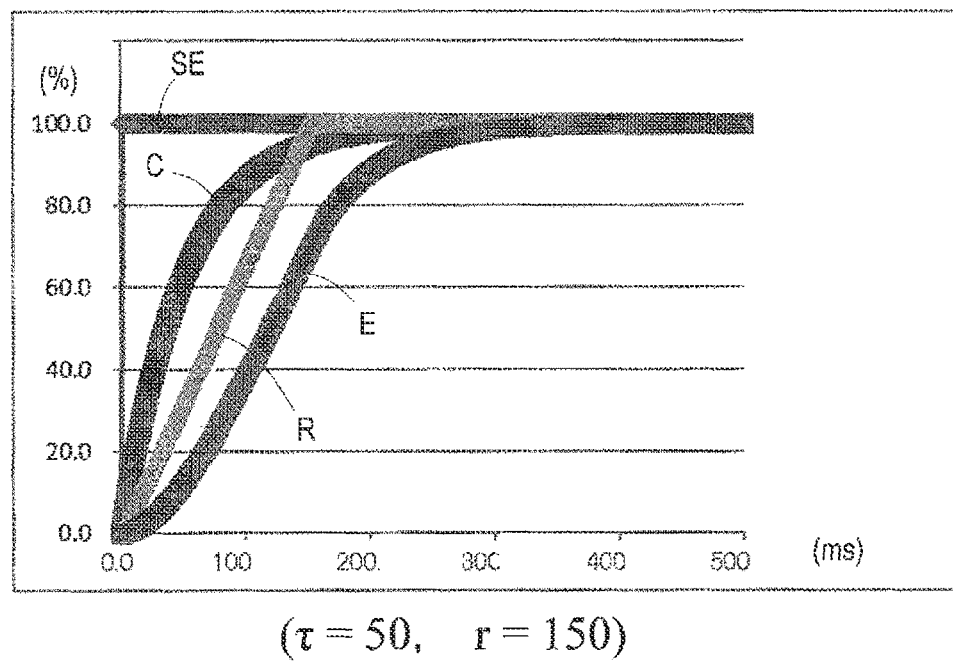
FIG. 5 is a graph showing each signal waveform when changing the time constant τ and the ramp parameter r.
Figure 5:
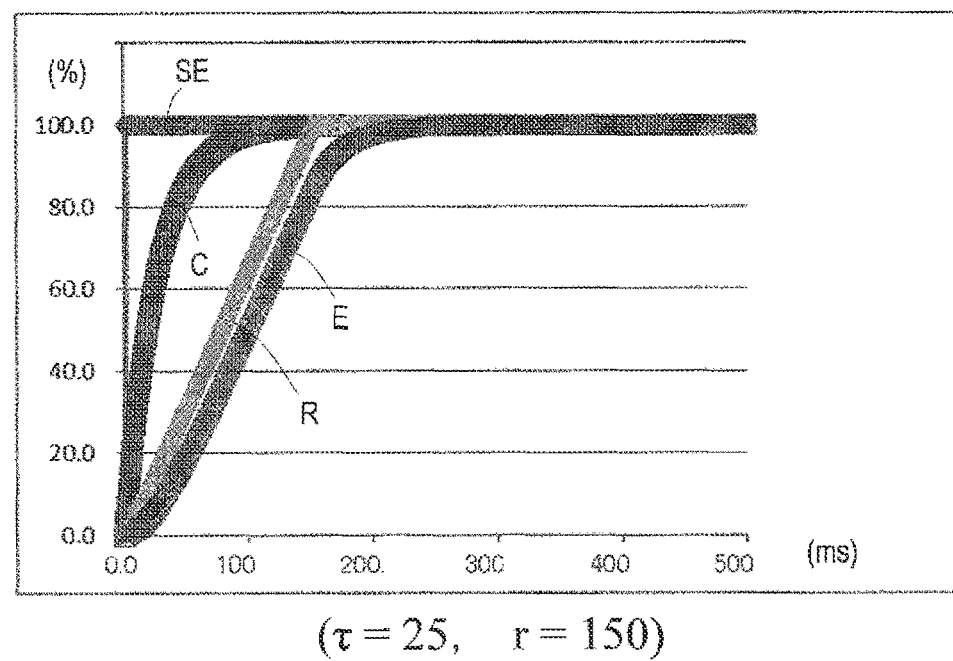

FIG. 4(a), FIG. 4(b) and FIG. 5(a), FIG. 5(b) show the external command signal SE and graphs C of the first order lag process, graphs R of the ramp process, and graphs of the internal command signals E, when changing the time constant τ (or time constant parameter X), and the ramp parameter r. FIG. 4(a) shows the case of (τ=50, r=300), FIG. 4(b) shows the case of (τ=25, r=300), FIG. 5(a) shows the case of when (τ=50, r=150), and FIG. 5(b) shows the case of (τ=25, r=150). In FIG. 4(a), FIG. 4(b), and FIG. 5(a), FIG. 5(b), the vertical axis is the flow rate (%), and the horizontal axis is the elapsed time (msec).

As can be seen from FIG. 4(a), FIG. 4(b) and FIG. 5(a), FIG. 5(b), the smaller the time constant τ and/or the ramp parameter r, the higher the responsivity of the internal command signal E can be generated. In particular, it can be seen that the setting of the ramp parameter r has a large influence on the responsivity.

Further, by setting the time constant τ, it can be seen that the approximation relation of the internal command signal E and the ramp processing graph R is changed. The smaller the time constant, the larger the ratio of the amount of change to be added to the previous value, so that it approaches the graph of the ramp process more quickly at the initial time of the rise. Therefore, it is understood that the response lag period at the initial stage of the rise can be adjusted by the setting of the time constant τ.

Therefore, an internal command signal effective to stably flow the gas can be generated in any waveform by a combination of the time constant parameter and the ramp parameter. The time constant parameters and ramp parameters may be configured to be determined on the basis of the received external command signals. For example, it can also be configured to use a relatively large value as the ramp parameter when the target flow rate indicated by the external command signal is small and use a relatively small value as the ramp parameter when the target flow rate indicated by the external command signal is large.

Figure 6:
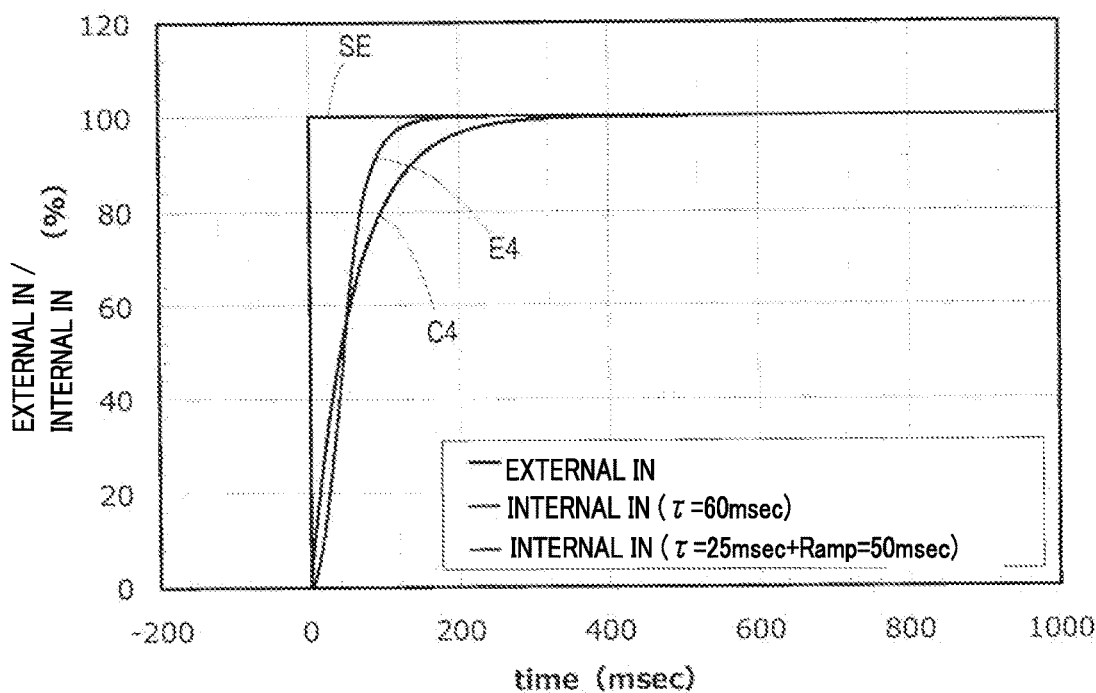
FIG. 6(a) shows a graph of the external command signal, a graph of a comparative example in which only the first-order lag process is the internal command signal, and a graph of an embodiment of a combination of the first order lag process and the ramp process.
FIG. 6(b) shows each of the actual flow rate response when using each of the respective internal command signal shown in FIG. 6(a).
Figure 6:
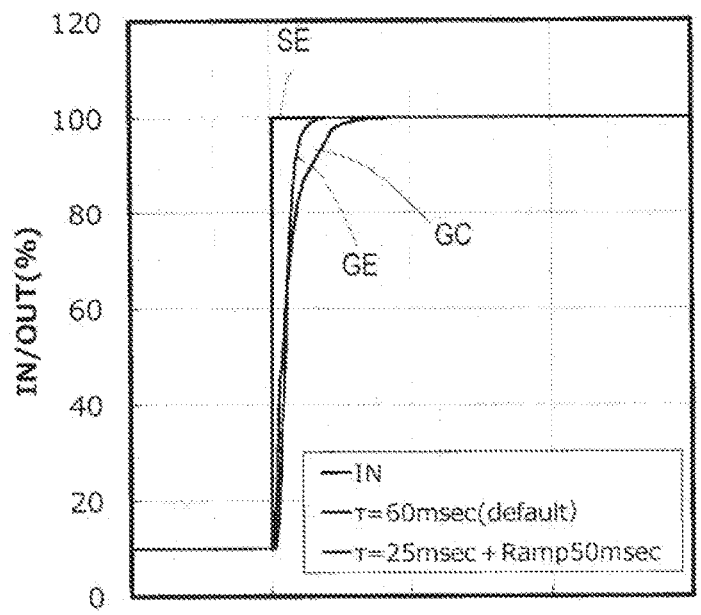

FIG. 6(a) shows the internal command signal C4 (comparative example) of the first order lag process of the time constant τ=60 msec, and internal command signal E4 (example) of the first order lag plus the ramp process set to the time constant τ=25 msec and the ramp parameter r=50 msec, when the external command signal SE is applied. FIG. 6(b) shows the measurement results GC and GE of the gas flow rates when using the internal command signals C4 and E4.

As can be seen from FIG. 6(a) and FIG. 6(b), in the internal command signal E4 of the embodiment, by selecting an appropriate parameter as the time constant τ and the ramp parameter r, it is possible to realize a smoother gas flow GE while reducing the response time. That is, in this embodiment, it was confirmed that, by parameterizing the time constant and the ramp coefficient and generating the internal command signal corresponding to the gas characteristics, the valve operating load can be reduced, also smooth rise and fast response can be achieved.

While embodiments of the present invention have been described above, various modifications are possible. For example, a pressure type flow rate control device for feedback controlling the control valve based on the output of the pressure sensor has been described above, in another embodiment of the present invention, the flow rate control device does not perform feedback control by the output of the pressure sensor, it may be configured to open-loop control the control valve.

In the flow rate control device of the open-loop control, the internal command signal is generated according to the flow rate setting signal received from outside. The internal command signal is output to the drive circuit of the piezo valve, the drive circuit determines the voltage applied to the piezoelectric element in accordance with the received internal command signal. In this manner, also when the control valve is open-loop controlled, by generating a signal which slowly rises at first and then converges to the target flow rate after a period of steeply rising elapses as described above as the internal command signal, the flow rate can be controlled with a smooth flow, in particular even during the rise to a small flow rate. In addition, as parameters, by appropriately setting the time constant t or the time constant parameter X and the ramp parameter r, it is possible to shorten the response time while maintaining a smooth flow.

In addition, although the internal command signal applied at the time of the flow rate rise has been described above, at the time of fall of the flow rate, as described in Patent Document 4, a gentle transition to a low flow rate may be performed while responsivity is ensured, on the basis of the exponentially attenuated internal command signal indicated by $I'(t)=I \cdot \exp(-t/\tau)$.

Furthermore, as described in Patent Document 4, in order to eliminate machine difference and unify the responsivity in a plurality of flow rate control devices, the internal command signal may be set to have a margin in response at the time of rise. By setting the above time constant $\tau$ and the ramp parameter r larger, it is also possible to realize the equivalent flow rate rise response characteristics in each flow rate control device.

INDUSTRIAL APPLICABILITY

The flow rate control device and the flow rate control method according to the embodiments of the present invention are suitably used for supplying a gas at a desired flow rate in semiconductor manufacturing equipment, or the like.

REFERENCE SIGNS LIST

1 Flow path
2 Restriction part
3 Upstream pressure sensor
4 Downstream pressure sensor
5 Temperature sensor
6 Control valve
7 Arithmetic processing circuit
8 Flow rate control device
9 Downstream valve
10 Process chamber
11 Vacuum pump
12 External control device

The invention claimed is:

1. A flow rate control device comprising:
a control valve having a valve element and a piezoelectric element for moving the valve element; and
an arithmetic processing circuit for controlling an operation of the control valve,
wherein the arithmetic processing circuit is configured to receive an external command signal corresponding to a target flow rate when opening the control valve from a closed state so that a gas flows at the target flow rate, and to generate an internal command signal to be output to a driving circuit for determining a voltage applied to the piezoelectric element based on the external command signal;
the internal command signal is a signal that rises with time from zero and converges to a value of the external command signal and is generated such that a slope at a time of initial rise and a slope immediately before convergence are smaller than a slope therebetween; and
the internal command signal is generated by a combination of first order lag process and ramp process.

2. The flow rate control device according to claim 1, wherein the internal command signal is generated according to the following equation, where I'n is a current value, $I'_{n-1}$ is a previous value, $Irmp_n$ is a current value of a ramp function defined by a ramp parameter r, X is a time constant parameter corresponding to a time constant t of the first order lag process $$I'_n = I'_{n-1} + (Irmp_n - I'_{n-1})/(1+X).$$

3. The flow rate control device according to claim 2, wherein the ramp parameter r and the time constant parameter X is configured to be set corresponding to the received external command signal.

4. The flow rate control device according to claim 1, wherein the target flow rate is a flow rate corresponding to 1 to 20% of a rated flow rate.

5. The flow rate control device according to claim 1 further comprising a restriction part provided downstream of the control valve, and a pressure sensor for measuring a fluid pressure between the control valve and the restriction part, wherein the control valve is configured to be feedback-controlled on the basis of an output of the pressure sensor.

6. A flow rate control method using a flow rate control device comprising a control valve having a valve element and a piezoelectric element for moving the valve element, the method comprising:
a step of receiving a step-shaped external command signal indicating a target flow rate; and
a step of generating an internal command signal based on the external command signal to be output to a driving circuit for determining a voltage applied to the piezoelectric element when opening the control valve from a closed state having a flow rate of zero,
wherein the internal command signal is a signal that rises with time from zero and converges to a value of the external command signal, and is generated such that a slope at the time of initial rise and a slope immediately before convergence are smaller than a slope therebetween; and
the internal command signal is generated by a combination of first order lag process and ramp process.

7. The flow rate control device according to claim 1, wherein the internal command signal is defined to have a curve at the time of initial rise with a slope angle gradually increasing and a curve immediately before convergence with a slope angle gradually decreasing.

8. The flow rate control method according to claim 6, wherein the internal command signal is defined to have a curve at the time of initial rise with a slope angle gradually increasing and a curve immediately before convergence with a slope angle gradually decreasing.

* * * * *